United States Patent [19]

Penney

[11] Patent Number: 4,625,238

[45] Date of Patent: Nov. 25, 1986

[54] METHOD AND APPARATUS FOR DETECTING A DEAD ZONE IN THE TRANSFER FUNCTION OF A SIGNAL PROCESSING SYSTEM

[75] Inventor: Bruce J. Penney, Portland, Oreg.

[73] Assignee: Tektronix, Inc., Beaverton, Oreg.

[21] Appl. No.: 722,944

[22] Filed: Apr. 12, 1985

[51] Int. Cl.[4] .................... H04N 17/00; H04N 17/06; H04B 17/00

[52] U.S. Cl. ................................. 358/139; 328/188; 330/2; 358/184; 360/25; 375/10; 455/67

[58] Field of Search ......................... 358/139, 10, 184; 375/10; 330/2; 324/77 R, 77 A, 95; 328/187, 188; 455/67; 370/13; 371/22; 178/69 A; 360/25

[56] References Cited

U.S. PATENT DOCUMENTS

| | | | |
|---|---|---|---|
| 3,427,558 | 2/1969 | McCutcheon | 330/2 |
| 3,434,065 | 3/1969 | Chu | 330/2 |
| 4,364,080 | 12/1982 | Vidovic | 358/139 |
| 4,414,568 | 11/1983 | Cluniat | 358/139 |
| 4,581,639 | 4/1986 | Judge | 358/139 |
| 4,583,233 | 4/1986 | Barrows | 358/139 |

*Primary Examiner*—Howard W. Britton
*Attorney, Agent, or Firm*—John Smith-Hill

[57] ABSTRACT

A dead zone in the transfer function of a signal processing system, such as a VTR, is detected by impressing on the system a test signal that is formed within a predetermined interval from a sinusoidal waveform modulated by an envelope function that reduces to zero at a predetermined time. The existence of the dead zone is detected by observing whether the corresponding output signal of the signal processing system has a constant amplitude at times other than the time at which the envelope function is zero.

5 Claims, 6 Drawing Figures

METHOD AND APPARATUS FOR DETECTING A DEAD ZONE IN THE TRANSFER FUNCTION OF A SIGNAL PROCESSING SYSTEM

This invention relates to a method and apparatus for detecting a dead zone in the transfer function of a signal processing system.

BACKGROUND OF THE INVENTION

One of the ways in which a video signal may be degraded during processing in a TV studio or other production facility is by the addition of noise (random, short-term variations in amplitude) to the video signals. One of the major sources of noise in a production facility is a video tape recorder (VTR). When a video signal is recorded on video tape in a VTR, and is subsequently played back, the transformation of the picture information from electrical form to magnetic form and back again may result in addition of a significant amount of noise to the video signal, over and above any noise that may be added during processing of the picture information in electrical form. VTR manufacturers attempt to design and manufacture VTRs with the best possible signal-to-noise (S/N) ratio.

The standard method of measuring the S/N ratio for a component VTR involves measuring the noise level added to a component signal (luminance or chrominance, or R, G or B) at a region of the signal that is of constant amplitude. This practice has led some VTR manufacturers to incorporate so-called dead-zone circuits in the VTR at a point in the signal path that is downstream of the playback heads. A dead-zone circuit has the characteristic that it responds linearly to large changes in input signal level but provides no response to small changes in input signal level. The threshold level, above which the circuit provides a linear response, is selected to be higher than the amplitude of the noise introduced in the record and play-back process. Consequently, the S/N ratio of the VTR, measured by the standard method, is very good. Use of a dead-zone circuit in a VTR might not be particularly objectionable in certain applications, e. g. where the VTR is used solely for recording and playing-back signals representative of pictures that have major areas of constant value and sharp transitions between areas of different value, such as many cartoons and certain computer generated graphics, but the dead-zone circuit results in serious degradation of signals representative of pictures with subtle gradations in value, such as pictures of human faces and of many indoor and outdoor scenes. In fact, after two or three tape-to-tape transfers, the dead-zone circuit can degrade a signal to the point that a serious question arises as to whether the signal can be used.

Dead-zone circuits are used with considerable subtlety. For example there may be different dead-zone circuits in high frequency and low frequency paths for the same component signal, and it is often difficult, even with the benefit of the schematic diagram for the VTR, to identify the dead-zone circuit and adjust it to minimize its deleterious effect.

The presence of a dead zone in a VTR can, in theory, be detected by use of a test signal comprising a horizontal sync pulse and a linear ramp. However, the dead zone only manifests itself by a slight shift in time of the ramp, and unless the original test signal and the signal received at the output of the VTR are superimposed on the screen of an oscilloscope or waveform monitor it is not possible to establish with a high degree of reliability whether there is a dead zone in the VTR.

SUMMARY OF THE INVENTION

In a preferred embodiment of the invention, a signal processing system, such as a VTR, is tested for the presence of a dead zone in its transfer function by impressing on the system a test signal formed by a high frequency sinusoidal waveform modulated by an envelope function having zero amplitude at a predetermined time. When the waveform of the signal at the output of the system is displayed, e. g. on an oscilloscope or waveform monitor, the time for which the sinusoidal waveform has a zero amplitude envelope can be measured. Knowing the manner in which the envelope amplitude of the input test signal varies with time, the presence of a dead zone can be detected, and the dead zone's threshold amplitude can be measured.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
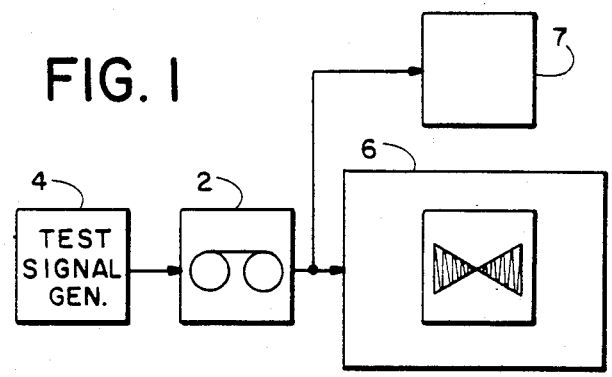
FIG. 1 shows in simplified block form the arrangement used to test a VTR for the presence of a dead zone.
Figure 2:
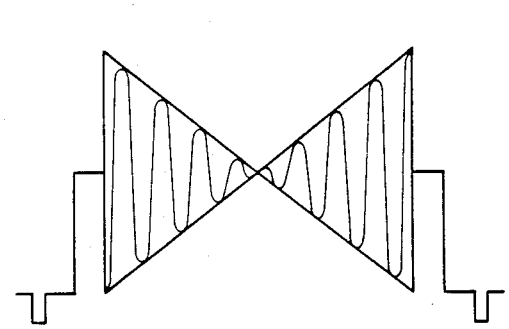
FIG. 2 is a graph representing a test signal that can be applied to a VTR to detect a dead zone.

As shown in FIG. 1, the arrangement for testing a VTR 2 for the presence of a dead zone comprises a test signal generator 4 and a waveform monitor 6. The test signal generator 4 comprises a PROM (programmable read-only memory) and a digital-to-analog converter. The PROM is programmed so that when it is addressed it generates a sequence of digital words that, when converted to analog form, has the waveform of a predetermined test signal. This manner of generating test signals is conventional, being used in the Tektronix 1910 Digital Generator. In the case of the arrangement shown in FIG. 1, the test signal has the waveform shown in FIG. 2, that is to say, it comprises, within the active picture interval, a sinusoidal waveform that is modulated by a linear ramp that passes through zero signal level.

Figure 3:
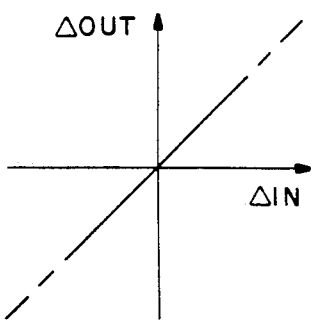
FIG. 3 is a graph representing the ideal transfer function of a VTR.
Figure 4:
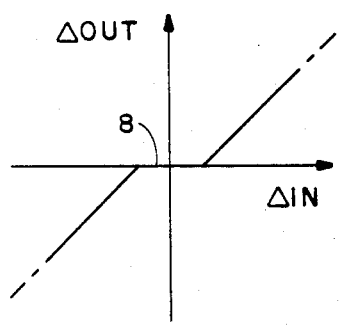
FIG. 4 is a graph representing the transfer function of a VTR with a dead zone.
Figure 5:
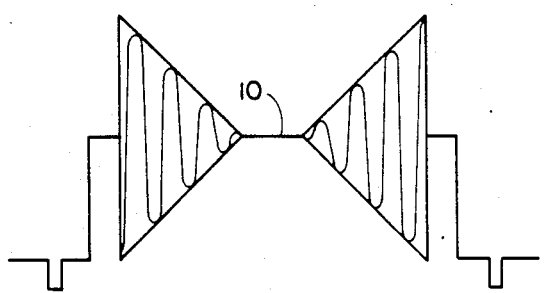
FIG. 5 is a graph representing the output signal that might be obtained from a VTR having a dead zone, in response to the test signal shown in FIG. 2.

When the test signal is passed through a VTR having an ideal transfer function, as shown in FIG. 3, the signal made available at the output of the VTR is identical to the test signal applied to the input of the VTR. However, when the test signal is passed through a VTR having a dead zone 8 (FIG. 4) in its transfer function, the non-linear response of the VTR to small signal level changes results in distortion near zero signal amplitude while leaving larger signal amplitudes essentially unchanged. This defect in the response of the VTR makes itself apparent as a lengthening of the zero-amplitude portion of the test signal, as shown in FIG. 5 at 10.

Knowing the slope of the linear ramp, the threshold value of the dead zone can be calculated from the amount by which the zero-amplitude portion of the test signal has been lengthened. The calculation may be performed automatically by an arithmetic unit 7 employing conventional digital signal processing techniques.

Figure 6:
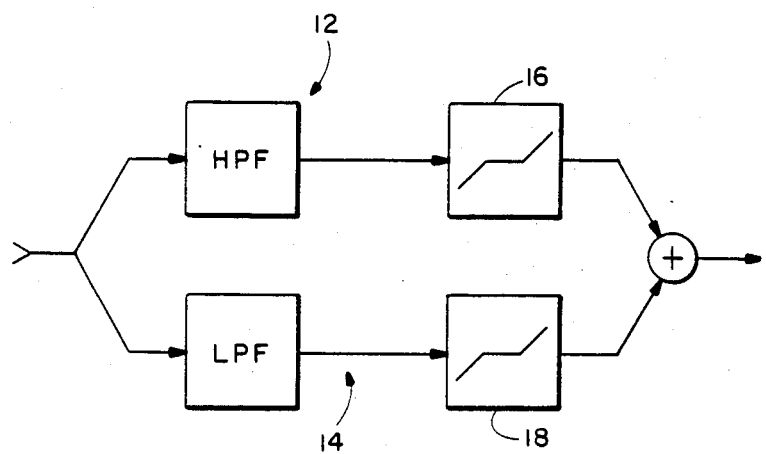
FIG. 6 is a block diagram of a portion of a VTR.

The frequency of the sinusoidal signal depends on the circuitry employed in the VTR. For example, if the signal path in the VTR were divided into a high frequency path 12 and a low frequency path 14, as shown in FIG. 6, two different frequencies would be employed, in accordance with the pass-bands of the two paths respectively, and this would enable dead zones 16 and 18 to be detected in each of the paths 12 and 14.

It will be appreciated that the invention is not restricted to the particular method and apparatus that have been described, and that variations may be made therein without departing from the scope of the invention, as defined in the appended claims, and equivalents thereof. For example, it is not essential that the function that modulates the sinusoidal waveform of the test signal be a linear ramp, and other functions that go to zero, or to an amplitude below the threshold level of the dead zone, may be employed. It is not essential that the modulating function go to zero for an essentially infinitesimal time, since the threshold value for a dead zone can be deduced from the added time of the zero-amplitude portion of the test signal.

I claim:

1. A method of detecting a dead zone in the transfer function of a signal processing system, comprising impressing on the system a test signal formed within a predetermined interval from a sinusoidal waveform modulated by an envelope function of which the absolute value reduces to zero at a predetermined time within said interval, and determining whether the corresponding output signal provided by the signal processing system has constant amplitude at times within said interval other than said predetermined time.

2. A method according to claim 1, wherein said envelope function is a linear ramp that intercepts the zero amplitude level at said predetermined time, and the method comprises measuring the length of the time within said predetermined interval for which said output signal has constant amplitude.

3. A method according to claim 1, comprising impressing a succession of test signals on the system, the sinusoidal waveforms of the test signals having different respective frequencies.

4. A method of detecting a dead zone having a predetermined threshold level in the transfer function of a signal processing system, comprising impressing on the system a test signal formed within a predetermined interval from a sinusoidal waveform modulated by an envelope function of which the absolute value reduces to an amplitude below said threshold value at a predetermined time within said interval, and determining whether the corresponding output signal provided by the signal processing system has a constant amplitude at times within said interval other than said predetermined time.

5. Apparatus for detecting a dead zone in the transfer function of a signal processing system, comprising means for generating a test signal formed within a predetermined interval from a sinusoidal waveform modulated by an envelope function of which the absolute value reduces to a predetermined minimum value at a predetermined time within said interval, and means for determining whether the corresponding output signal provided by the signal processing system has a constant amplitude at times within said interval other than said predetermined time.

* * * * *